Oct. 17, 1967 W. SOULE, JR., ET AL 3,348,215

MAGNETIC DRUM MEMORY AND COMPUTER

Original Filed Dec. 27, 1961 11 Sheets-Sheet 1

INVENTORS
Winsor Soule, Jr.
Eugene P. Binnall

Strauch, Nolan, Neale, Nies & Bronaugh
ATTORNEYS

INVOICE

NAME

ADDRESS 10 20 30 40 50 60 70 80 90

| | QUANTITY ORDERED | QUANTITY SHIPPED | QUANTITY BACK ORDERED | DESCRIPTION | PRICE | GROSS AMOUNT | DISCOUNT % | NET AMOUNT |
|---|---|---|---|---|---|---|---|---|
| | 55 | 50 | 5 | BRASS PULLEYS NO. 3 | 43.50 | 2175.00 | 15.0 | 1848.75 |
| | 1500 | 1250 | 250 | BELAYING PINS | 126.00M | 157.50 | | 157.50 |
| | 144 | 144 | | FENDERS | 8.67 | 1248.48 | 10.0 | 1123.63 |
| | 200- | 200- | | CLEATS - RETURNED FOR CREDIT | 0.80- | 160.00CR | | 160.00CR |
| | | | | | | | | 2969.880 |
| | | | | DISCOUNT | | | 15.5 | 460.33CR |
| | | | | | | | | 2509.550 |
| | | | | SALES TAX: STATE | | | 4.0 | 100.38 |
| | | | | CITY | | | 0.5 | 12.55 |
| | | | | FREIGHT | | | | 346.93# |
| | | | | TOTAL | | | | 2969.41* |
| | | | | DAILY GROSS AMOUNT TOTAL | | 3420.98* | | |
| | | | | DAILY FREIGHT TOTAL | | 346.93* | | |
| | | | | DAILY NET AMOUNT TOTAL | | 2969.41* | | |
| | | | | DAILY RET'D FOR CREDIT GROSS TOTAL | | | | 160.00CR |

Fig. 2

Strauch, Nolan, Neale, Nies & Bronaugh

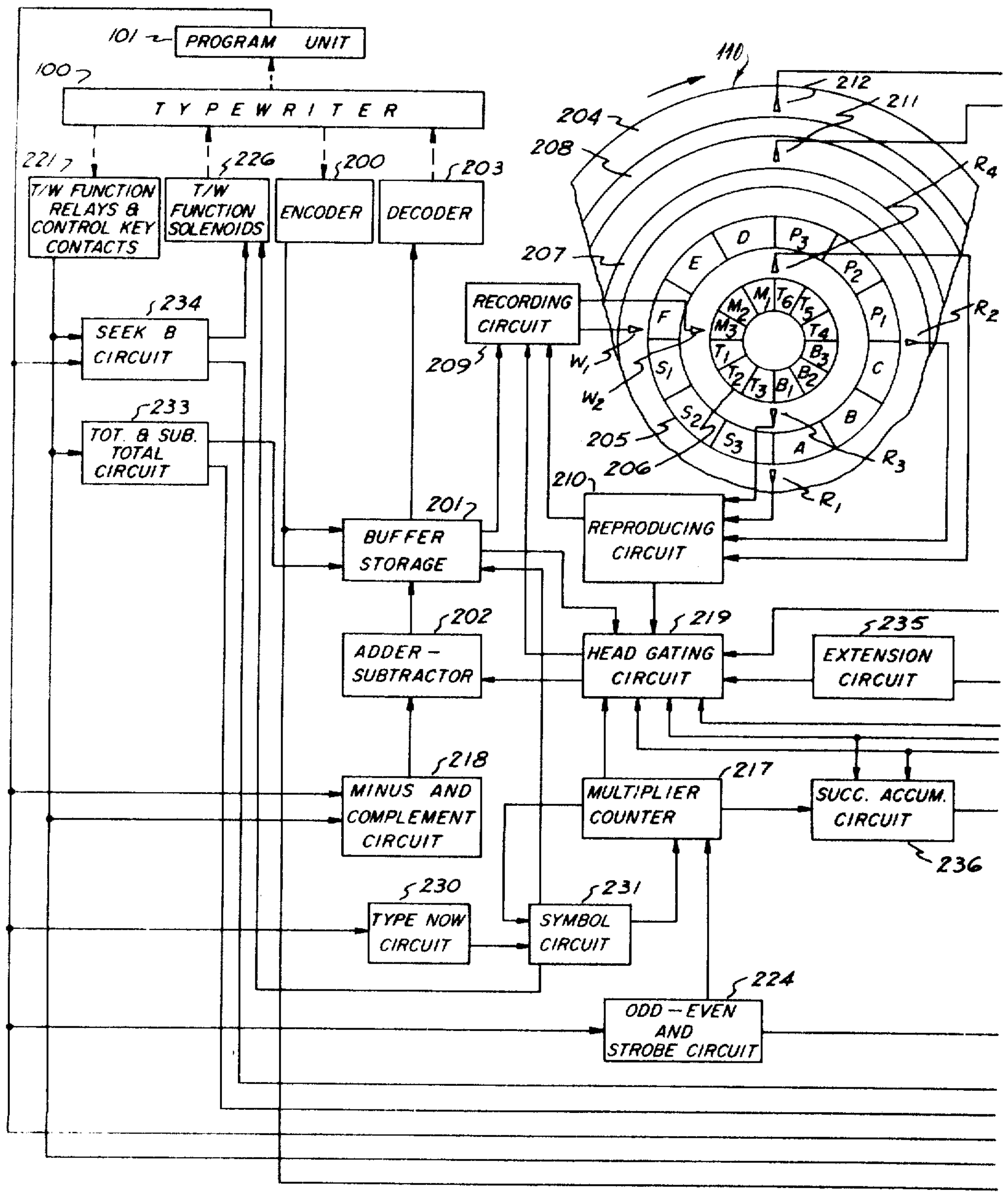
FIG_3(a)
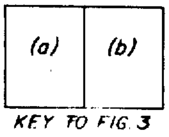
Strauch, Nolan, Neale, Nies & Bronaugh

Oct. 17, 1967 W. SOULE, JR., ET AL 3,348,215

MAGNETIC DRUM MEMORY AND COMPUTER

Original Filed Dec. 27, 1961 11 Sheets-Sheet 4

Strauch, Nolan, Neale, Nies & Bronaugh

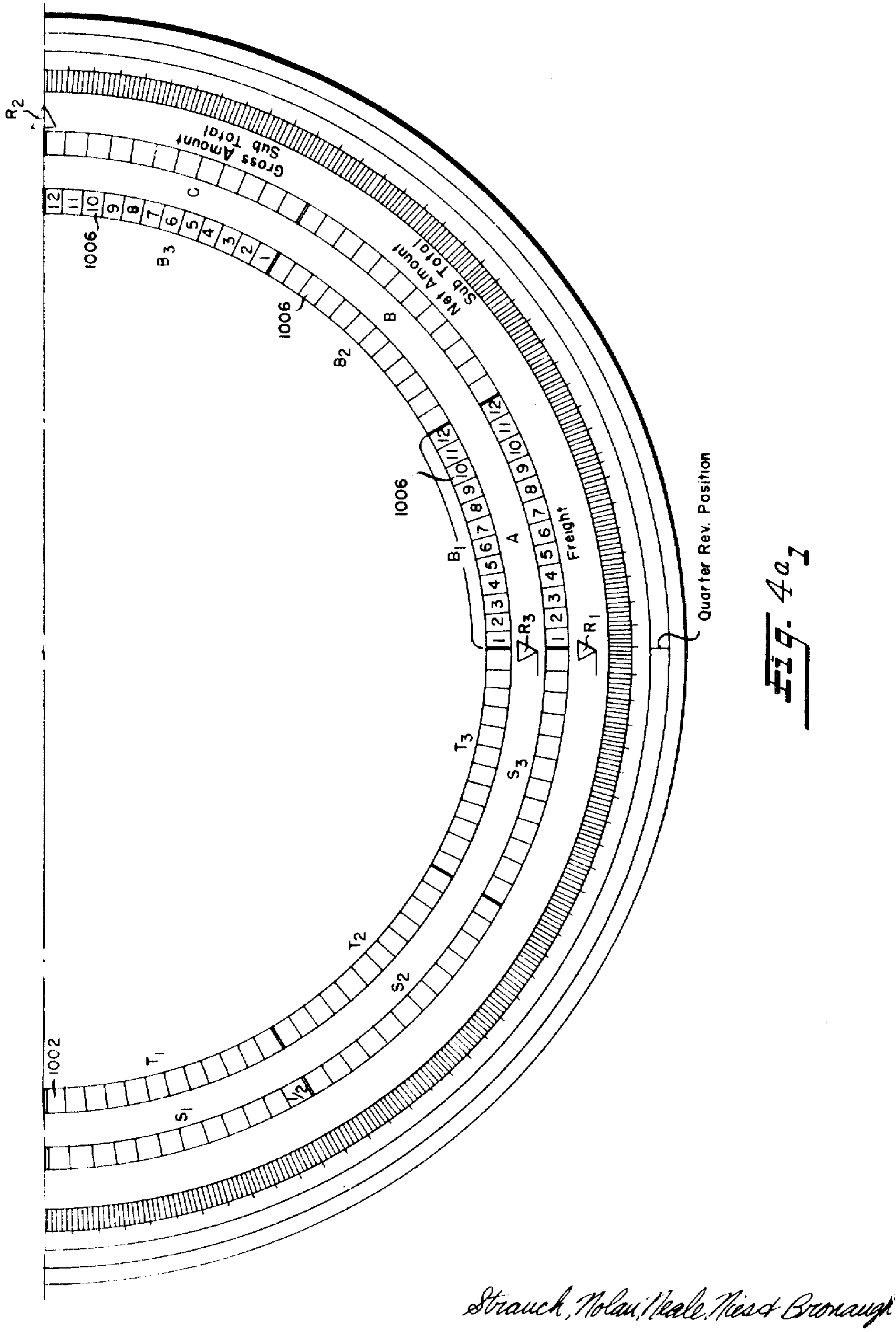
Fig. 4a1
Strauch, Nolan, Neale, Nies & Bronaugh

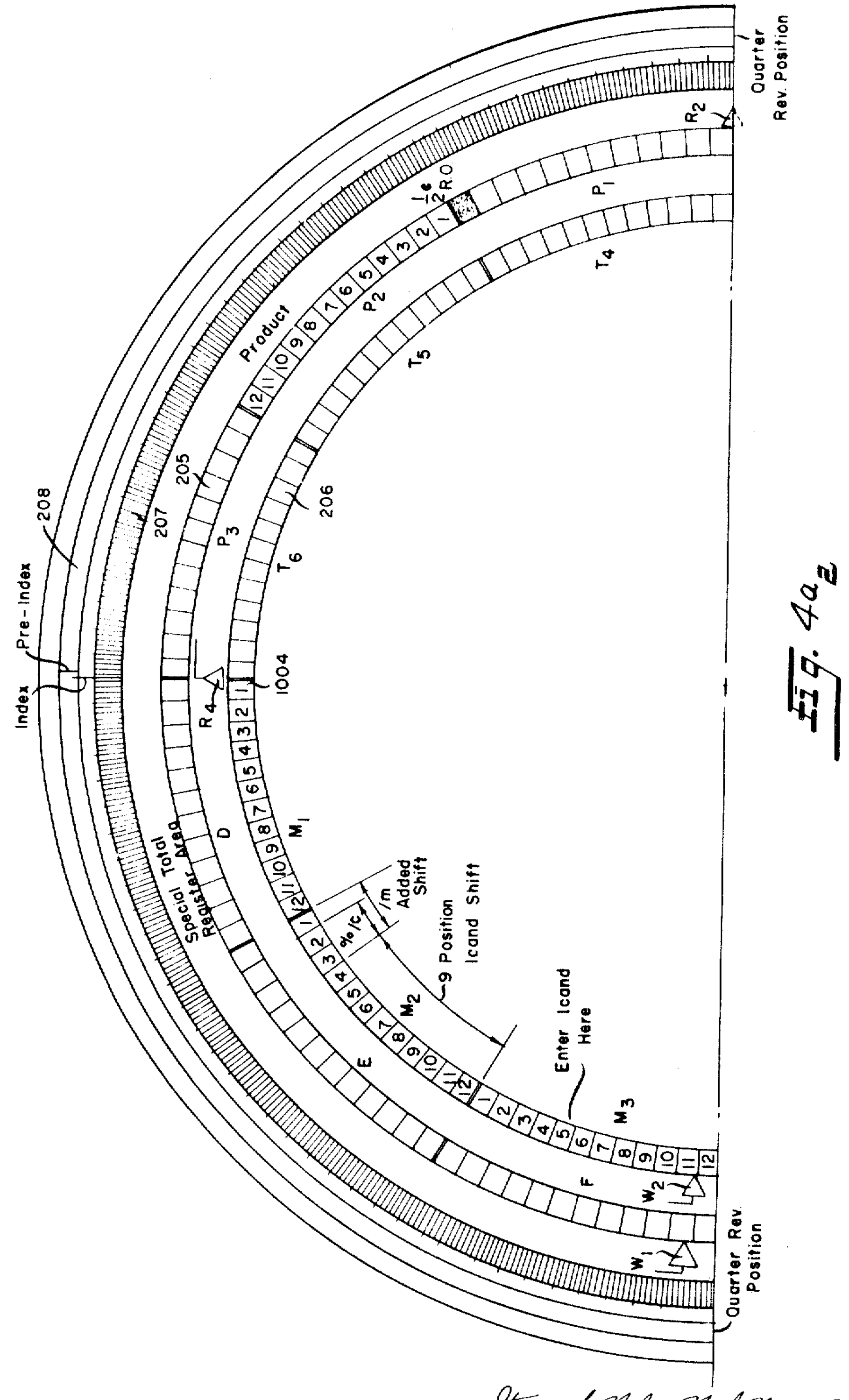
Fig. 4a2
Strauch, Nolan, Neale, Nies & Bronaugh

Strauch, Nolan, Neale, Nies & Bronaugh

Strauch, Nolan, Neale, Nies & Bronaugh

Strauch, Nolan, Neale, Nies & Bronaugh

Strauch, Nolan, Neale, Nies & Bronaugh

Strauch, Nolan, Neale, Nies & Bronaugh 3,348,215

MAGNETIC DRUM MEMORY AND COMPUTER

Winsor Soule, Jr., Berkeley, and Eugene P. Binnall, El Cerrito, Calif., assignors to SCM Corporation, New York, N.Y., a corporation of New York Original application Dec. 27, 1961, Ser. No. 162,526, now Patent No 3,265,874. Divided and this application Apr. 29, 1966, Ser. No. 546,290
23 Claims. (Cl. 340—172.5)

Figure 1:
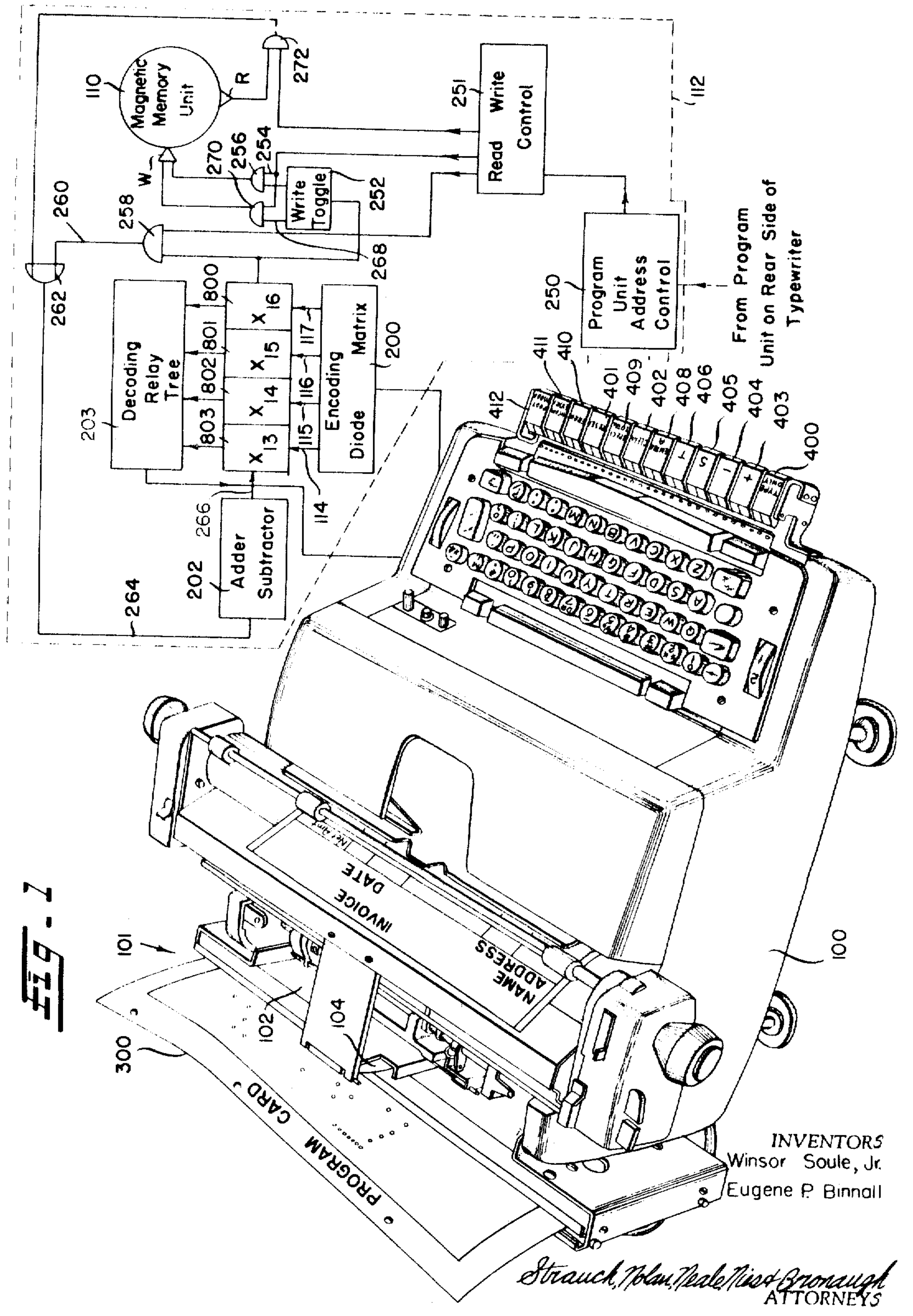

This application is a division of U.S. application Ser. No. 162,526 filed Dec. 27, 1961 entitled Data Processing Devices and Systems, now Patent No. 3,265,874.

The system in the above patent is comprised of a typewriter, an electronic calculating unit and programming devices, all interrelated in such a manner that desired accounting transactions are recorded by manipulation of the typewriter keyboard and all necessary computations are concurrently carried out by the electronic calculating system and automatically typed out to produce an invoice or bill of suitable format. The typewriter serves as an output device when computed results are transmitted to the typewriter, and printed thereby. The requisite synchronization between the typewriter and calculating portions of the system, as well as the sequencing and programming of specific operations, are accomplished by typewriter responsive devices which effect controls in correspondence with displacement of the typewriter carriage. The control devices may be varied for different types of transactions, and their controls may be overriden by manipulations of certain keys on the typewriter.

While the inputs and outputs of the system are decimal, the electronic computing system processes numbers in binary-decimal code. Because of the high speed of the calculating portion of the device and relatively low speed of typewriter operation, all calculations are carried out in serial form, thereby reducing the quantity of electronic components involved, and eliminating circuit duplication inherent in parallel calculating systems.

An essential component of the electronic calculating system is a memory device which serves to receive numerical entries under control of typewriter keys, and which, combined with appropriate logic circuitry, is utilized in carrying out arithmetic operations. For normal invoicing operations such as are carried out by the illustrated embodiment of this invention arithmetic functions of addition, subtraction and multiplication are involved, but other more sophisticated computations could be carried out by further extensions of the present teaching.

It is the object of this invention, therefore, to provide an improved electronic memory and computing system capable of functioning at speeds adequate for use with a typewriter input and output system.

Further objects of this invention are:

A novel memory track, recording head and reproducing head arrangement in the memory unit to provide addition, subtraction and multiplication operations as well as input of information into and retrieval of information from the memory unit, at speeds adequate for use with the typewriter as the input-output unit.

A novel memory unit having only two memory tracks with a single write head with each track and two read heads for each track, all of the heads being located at substantially quarter revolution positions for providing adequate flexibility for an invoicing operation and speed of operation with reduced cost resulting from a memory unit having simplified physical construction.

A novel arrangement including a one digit delay shift register and a memory unit wherein the read heads are located at quarter revolutions and the write heads at approximately one digit position beyond a quarter revolution position in the direction of rotation to facilitate shifting of digits in the memory unit one digit area at a time for control of decimal point and for carrying out multiplication operations.

A novel system in connection with a simplified memory unit layout for accumulation into separate accumulate register areas, for shifting of the multiplicand into the central portion of a quarter area of one of the memory tracks for successive additions with the values in diametrically opposite quarter track areas in the other track, and for complementing each plural digit number and then detecting the signs before type-out of any plural digit value by the typewriter.

A novel transfer system for recording information in the memory unit at one location as it is reproduced from another location, either with or without modification, including a circuit having a one digit delay register.

Figure 3B:
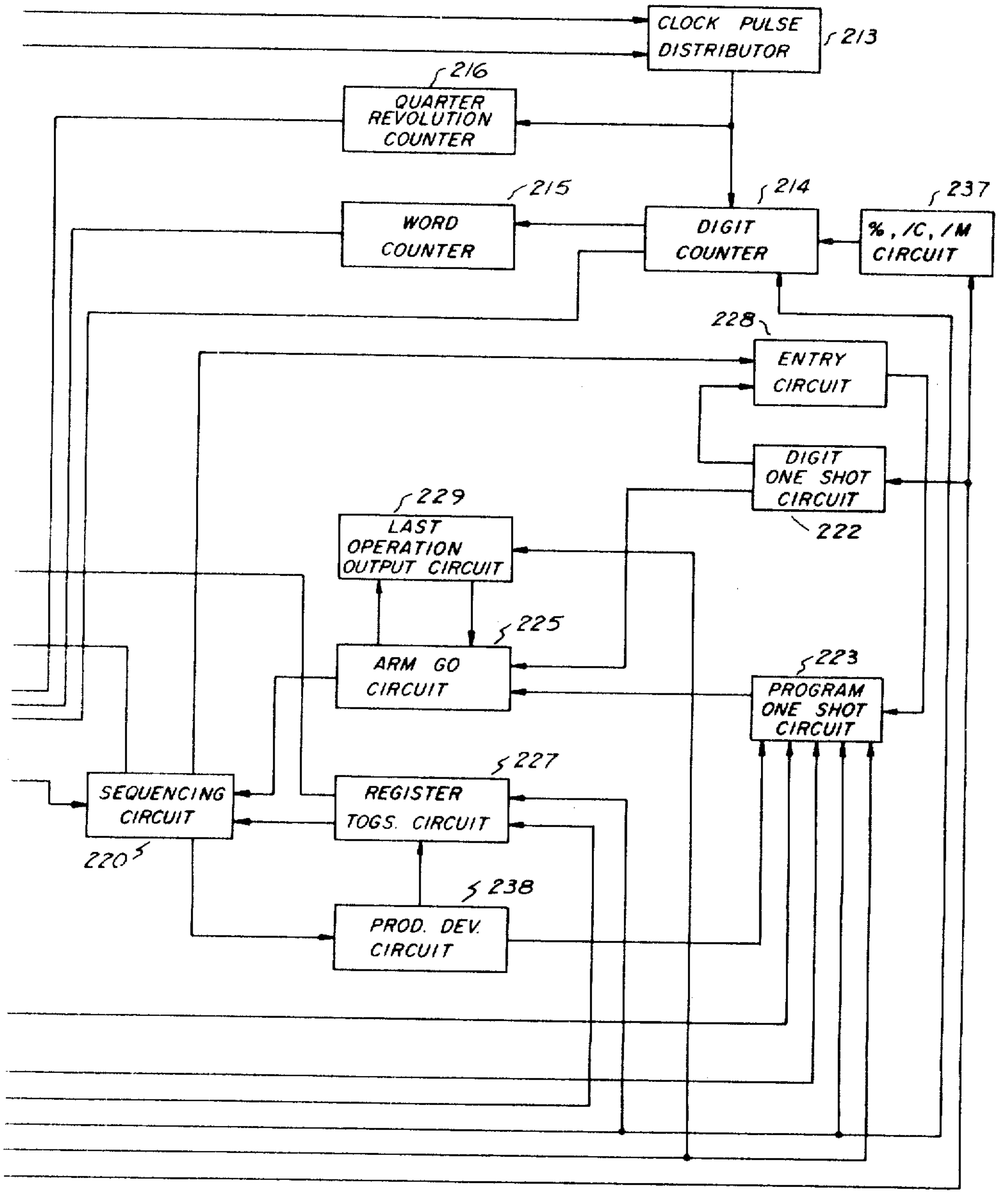
Figure 4B:
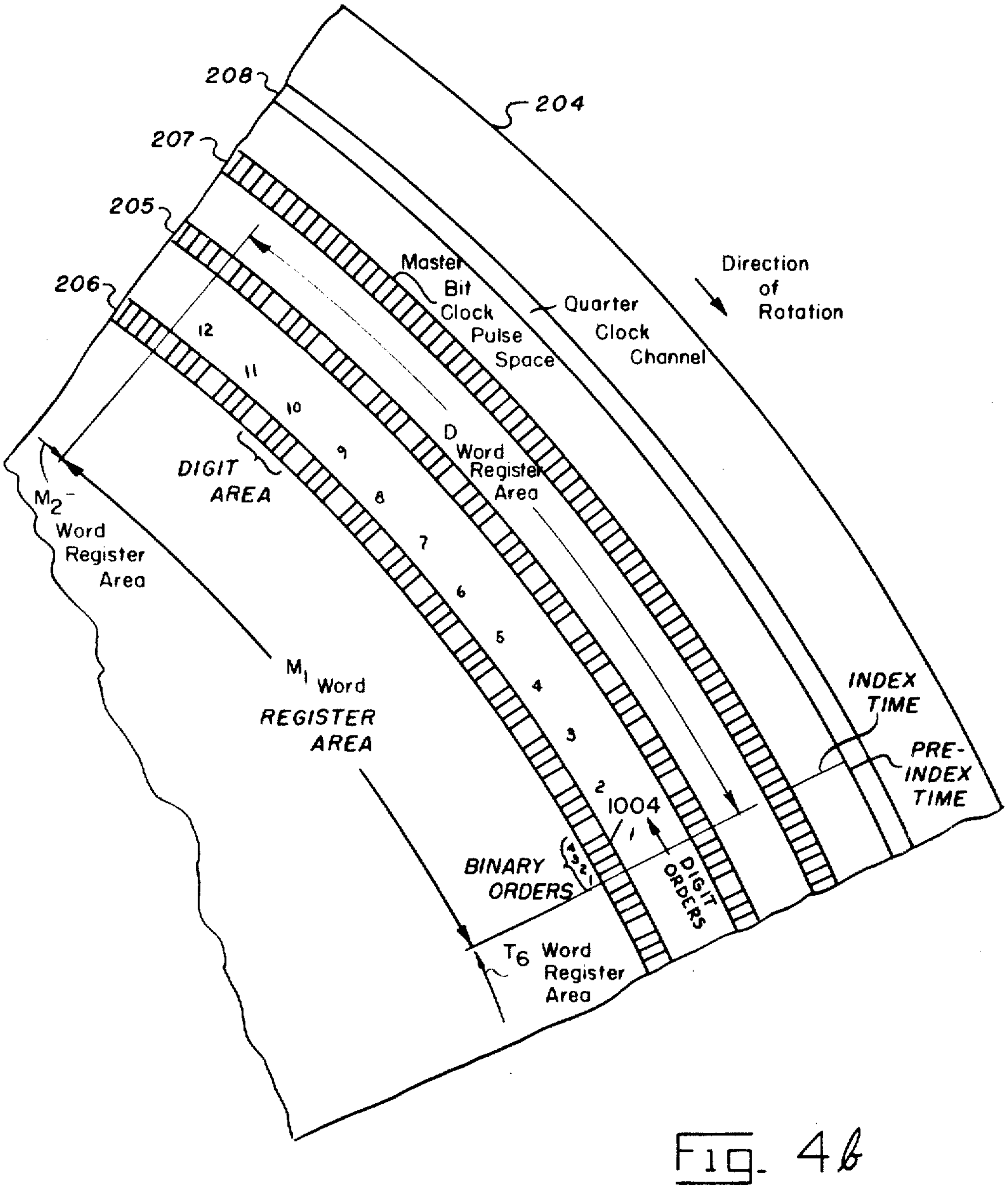

These and other objects of the invention will become more fully apparent from the claims, and from the description as it proceeds in connection with the drawings wherein:

FIGURE 1 is a diagrammatic illustration of the electronic calculator of the present invention showing in detail the typewriter which serves as the input-output unit, the arrangement of the program for the computer in accordance with the position of the carriage on the typewriter, the memory unit, and the encoding and decoding circuitry for transmitting a digit entered on the keyboard of the typewriter to the memory unit and for retrieving a digit from the memory unit to be printed on the invoice sheet by the typewriter;

FIGURE 2 shows an invoice sheet which may be typed by the typewriter unit in the calculator of the present invention;

FIGURES 3(*a*) and 3(*b*) together are a functional block diagram of the automatic typing calculator;

FIGURES $4a_1$ and $4a_2$ together show the two information tracks on the memory unit along with the record or write heads $W_1$ and $W_2$ and reproduce or read heads $R_1$ through $R_4$ and the two clock tracks;

FIGURE 4*b* is a view of a portion of the memory unit which is enlarged to show the relative location of the various bit, digit, and word register areas and the clock timing areas;

FIGURES 4*c*, 4*d*, 4*e* and 4*f* illustrate the information track on the memory disk in its positions at the beginning of the first quarter revolution, the second quarter revolution, the third quarter revolution and the fourth quarter revolution, respectively.

Figure 5:
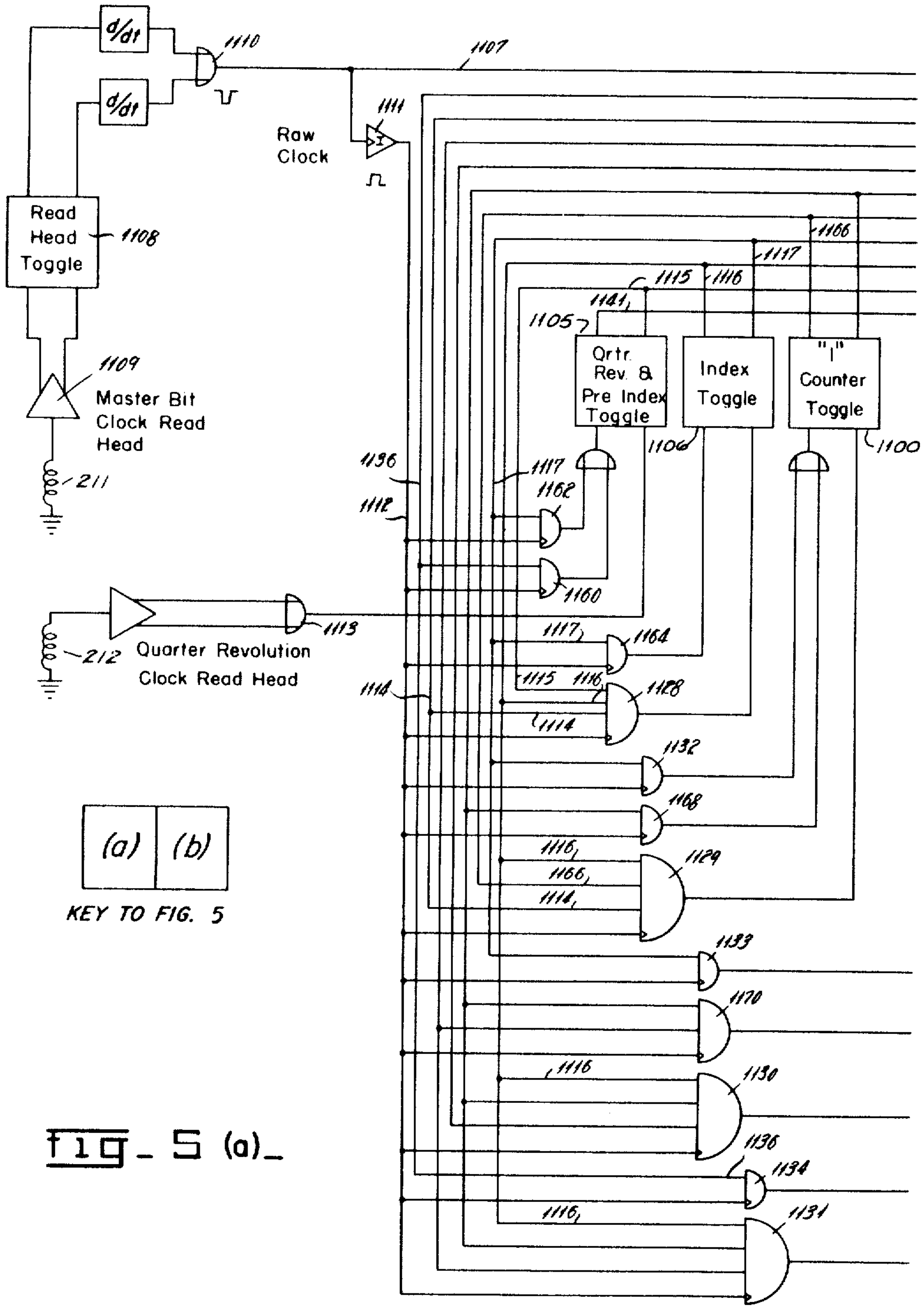
Figures 5B, 6:
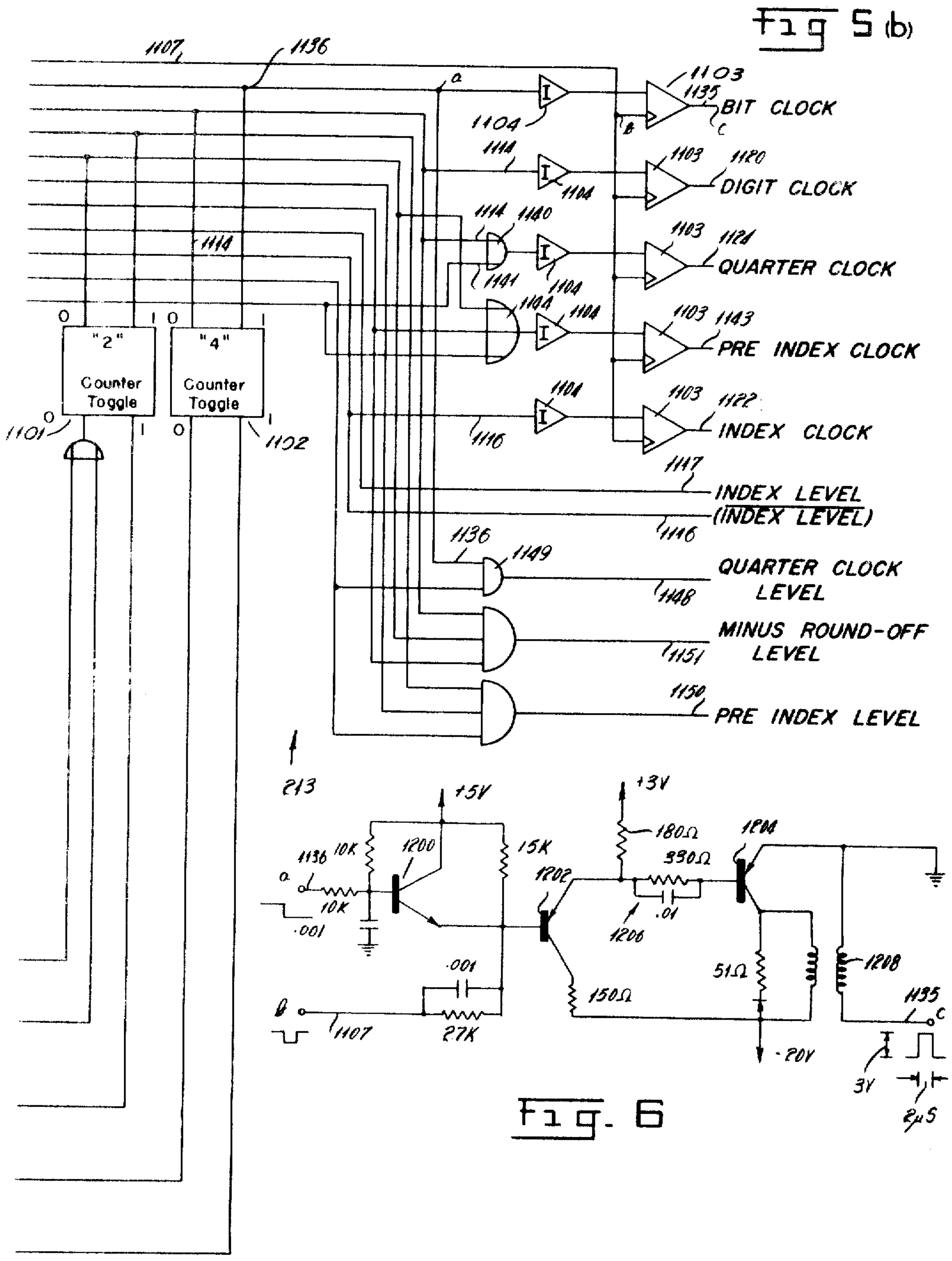
Figure 7:
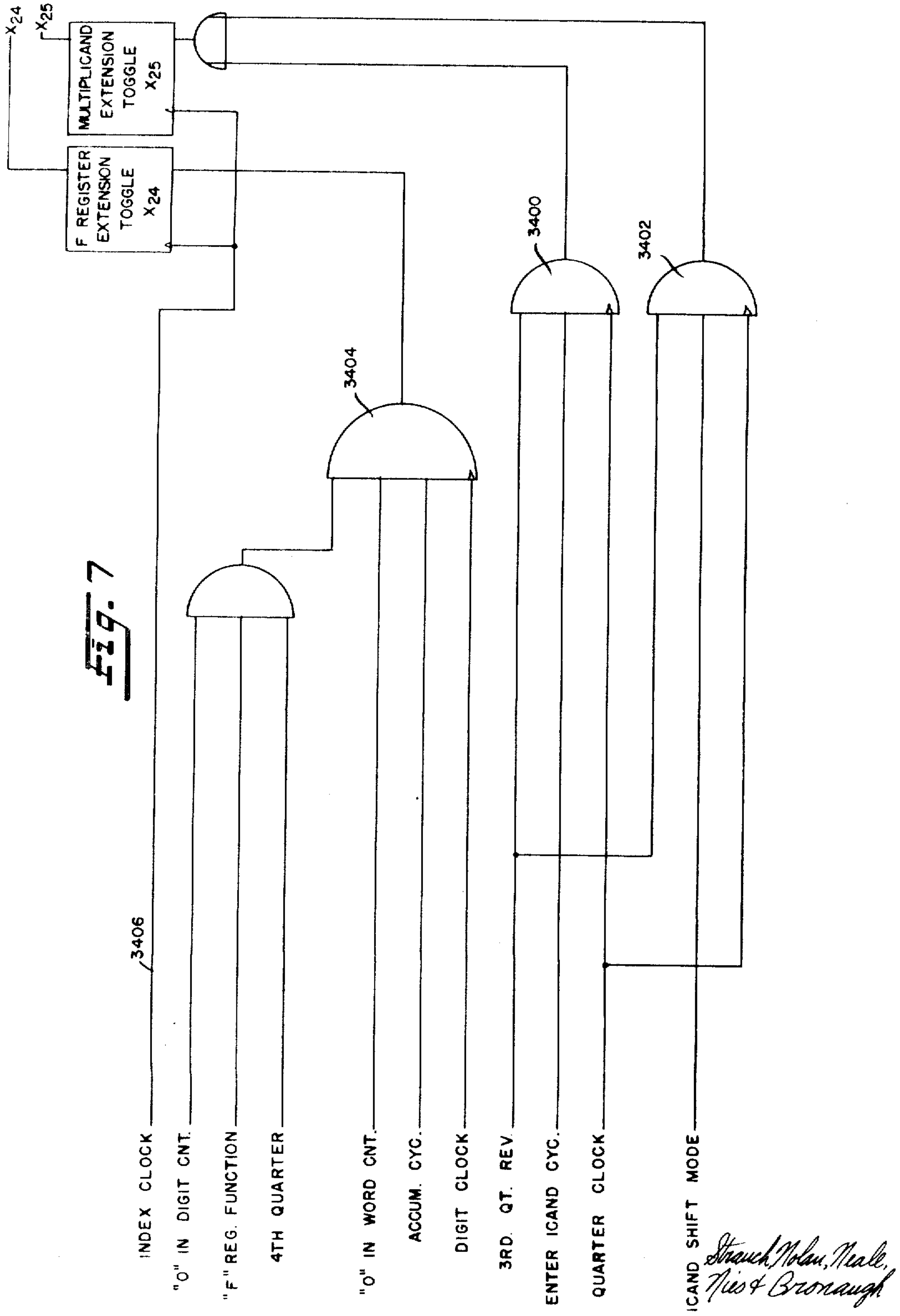

FIGURES 5(*a*) and 5(*b*) together comprise the logic diagram of the clock pulse distributor in which clock pulses are developed for synchronizing the operation of the system;

FIGURE 6 is a circuit diagram of a combination *or* gate and inverter circuit as used for producing the quarter clock, and pre-index clock pulses in the circuit of FIGURE 5; and FIGURE 7 is a logic diagram for the extension toggles.

Figures 4C, 4D, 4E, 4F:
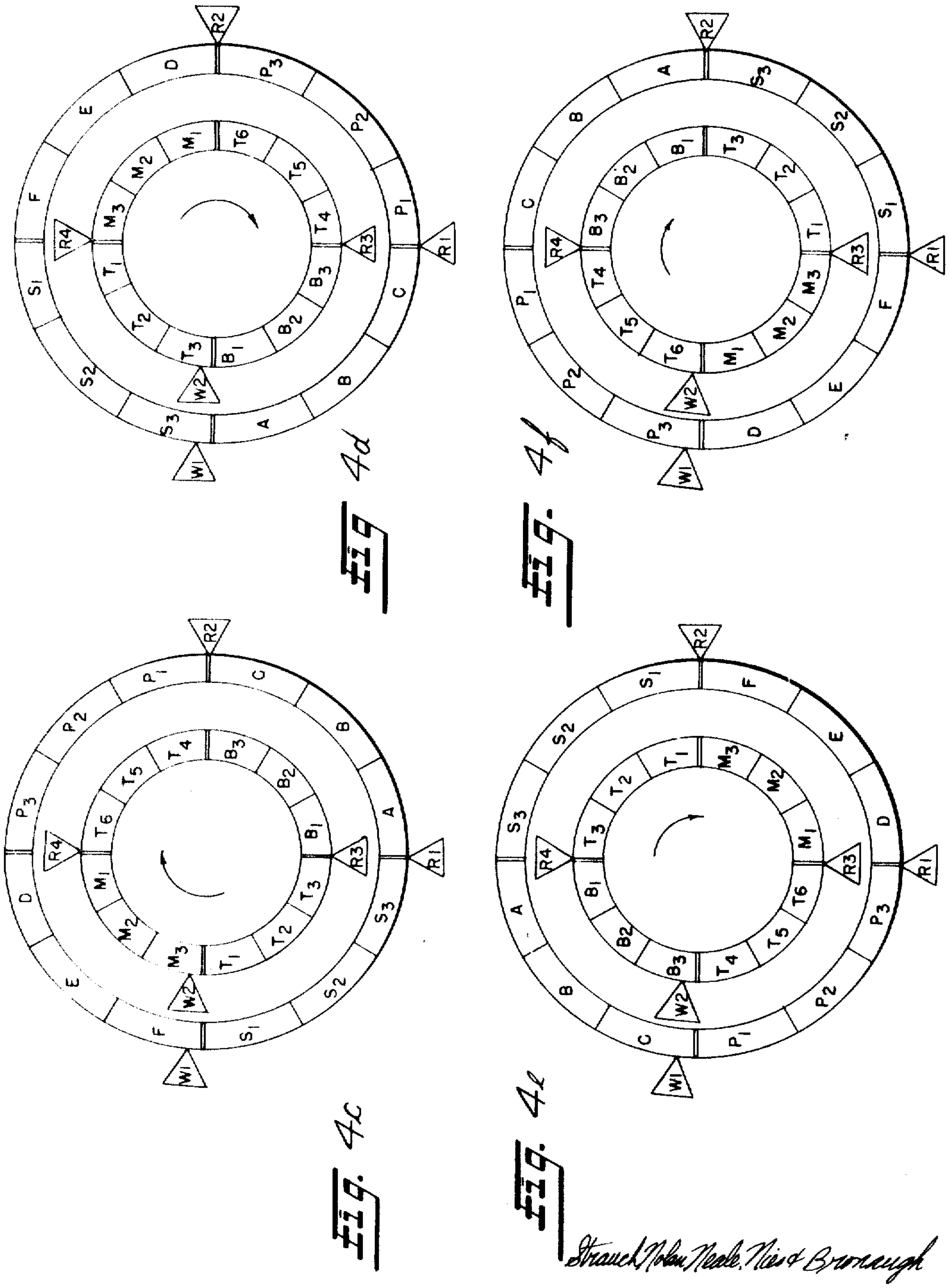

Of the above, FIGURES 1 and 2 correspond to FIGURES 1 and 2 of the parent application; FIGURES 3(*a*) and 3(*b*) correspond to FIGURES 5(*a*) and 5(*b*); FIGURES 4*a* and 4*f* correspond to FIGURES 10(*a*)–10(*f*); FIGURES 5(*a*) and 5(*b*) correspond to FIGURES 11(*a*) and 11(*b*); FIGURE 6 corresponds to FIGURE 12; and FIGURE 7 corresponds to FIGURE 34. The same reference characters have been retained in this disclosure to facilitate correlation with the parent case.

The general organization of the data processing system is fully explained in the parent application and for the purposes of overall description in this divisional case, it will be sufficient to refer to FIGURES 1 and 3(*a*), 3(*b*). FIGURE 1 illustrates in perspective, input-output typewriter 100 and gives a very condensed diagram of electronic components, along with information flow lines interconnecting them. It will be understood that the electronic portion of the system, within the dotted line perimeter 112, is located, preferably, within a desk which supports the typewriter. A more comprehensive block diagram of the overall system is shown in FIGURES 3(*a*) and 3(*b*) with memory disc 110 and associated components such as recording circuit 209, buffer storage 201, adder/subtractor 202, multiplier counter 217, reproducing circuit 210 and other functions illustrated in block diagram form to be correlated with greater particularity.

In FIGURE 2, there is shown an invoice form having a total of eight columns. The printings in columns 1–5 and 7, counting from the left, are effected by manipulation of appropriate typewriter keys, while those in columns 6 and 8 are brought about by the electronic computing structure of which the magnetic memory is an active component. Data printed in columns 2, 5 and 6 is transmitted to the electronic computing structure, as inputs, and the computation process is controlled as a result of the advancement of the typewriter carriage.

One of the unique features of this invention resides in the utilization of a small inexpensive memory unit of modest capacity, which comprises a rotating disk with a magnetizable coating, having four tracks on its surface, two only of which contain information, the other two being clock tracks, and a particular arrangement of read and write heads which enables the unit to perform arithmetical operations, in addition to memory or data retention functions, and clocking controls. The magnetic memory unit per se is not a part of the invention claimed here, but is disclosed and claimed in U.S. Patent No. 3,135,949.

The rotating storage disk 204 shown in detail in FIGURES 3(*a*) and 4 contains only two information tracks 205 and 206 and two clock tracks 207 and 208. Each of the two information tracks is divided into four quarters or quadrants and each of the quarters is further subdivided into thirds. Each of these thirds is designated as a word register area or segment on which a binary coded, plural digit, decimal number may be stored.

Each of the word register areas is sub-divided (see FIGURE 4*a*) into twelve digit areas in zones into which a number having up to ten decimal digits and the sign of the number may be stored. The twelfth digit area or zone is generally unused excepting for special features which will be discussed in detail below.

Each digit area is sub-divided into four binary bit areas as best shown in FIGURE 4*b* and on which may be stored the binary bits of a binary coded decimal digit. The digit areas are separated from each other by one clock bit, also referred to as a master clock pulse space (see track 207). This space is useful for several purposes, including as a means to provide a time during which to gate on a reading head without danger of missing the first bit signal and means to provide the time required during an addition or subtraction process to determine whether buffer storage toggles $X_{13}$, $X_{14}$, $X_{15}$ and $X_{16}$ (FIGURE 1) contain a value which must be corrected, and if so to convert that digit to the correct decimal digit by the addition or subtraction of 6 prior to continuation of the addition or subtraction process on the next digit.

Memory unit 110 (FIGURES 3(*a*) and 4(*a*) is provided with two write or record heads $W_1$ and $W_2$ associated with information channels 205 and 206 respectively and four read or reproduce heads $R_1$, $R_2$, $R_3$, and $R_4$. Read heads $R_1$ and $R_2$ are associated with recording channel 205 and read heads $R_3$ and $R_4$ are associated with recording channel 206. Two additional read heads (211, 212 on FIGURE 3(*a*) are associated with clock tracks 207 and 208.

The phase relation of the memory disk relative to the fixed read and write heads and of the various heads with respect to one another shown in FIGURES 3(*a*) and 4*a* is such that the index position of the clock tracks 207 and 208 lies along the radial line through read head $R_4$. This is referred to as the reference position of disk 204 which is illustrated diagrammatically in FIGURE 4*c*. After a quarter revolution of disk 204 in a clockwise direction, the index position will lie along the radial line through read head $R_2$ as shown in FIGURE 4*d*. At the end of the second quarter revolution, the index position will lie along the radial line through read heads $R_1$ and $R_3$ as illustrated in FIGURE 4*e*. At the end of the third quarter revolution, the index position will be slightly greater than one digit area position short of lying on the radial line passing through write heads $W_1$ and $W_2$.

Write heads $W_1$ and $W_2$ are displaced in the direction of disk rotation from a quarter revolution position by an amount slightly greater than one digit area, i.e. 5 bit areas (see FIGURE 4*b* to permit a digit read from one position on the memory unit to be applied to the $X_{13}$ toggle 803 and sequentially passed through toggles 802 and 801 to toggle 800 (see FIGURE 1) from which it is then applied to a write head $W_1$ or $W_2$ for recording in another register on the memory unit. For example, if the digit recorded in the number one digit area of the storage register of the buffer storage register $B_1$ is read out by read head $R_3$ it will normally (except during part of the multiplication operation as will be explained below) pass through buffer storage toggles 803–800. By the time the first bit of this digit is available at toggle 800 of buffer storage for transmission to write head $W_2$, for example, disk 204 will have advanced one digit area (plus a small additional displacement to compensate for delay in the circuitry) whereby the number 1 digit area 1002 (FIGURE 4(*a*) is in a recording position under write head $W_2$ because of the displacement of write head $W_2$ from an exact quarter position relative to read head $R_3$.

It should be understood that for each information track 205, 206 the relation of the heads with respect to one another and to the clock features of the memory is as illustrated in FIGURES 4*a*–4*b*. However, the relative phasing between or physical location of the heads of the two tracks is not restricted to that shown; the phase or physical location of read and write heads of track 205 may be shifted to the extent desired with respect to the read and write heads of track 206. As a practical matter, such shift is desirable to provide physical space for mounting of components. As will be appreciated by those skilled in the art, the close mounting of read and write heads presents both mechanical and electrical problems which can be avoided by separation through staggered physical location or phasing.

A plural order number is stored in the register areas, for example $M_1$ of track 206, with the lowest decimal order first, and with the lowest bit order first, in the direction of disk rotation. For example, the lowest order bit area of the lowest order digit area of a register area $M_1$ (FIGURE 4*b* is the first bit area 1004 in the counter-clockwise direction from the boundary with the $T_6$ word register area.

To round out the description of the memory structure, a fuller explanation of timing tracks 207 and 208 and their respective read heads 211 and 212, along with their function follows:

Timing pulses are reproduced from clock tracks 207 and 208, and applied to diverse control circuits fully disclosed in the parent application to produce the following distinct clock pulse trains once per revolution:

(1) One index pulse at the beginning of the first quarter revolution;

(2) One pre-index pulse which precedes the index pulse by one master clock period, i.e., at the end of the fourth quarter;

(3) Four quarter pulses, one corresponding to the beginning of each quarter;

(4) One hundred and forty-four digit pulses, spaced evenly, corresponding to each fifth master clock pulse, commencing in synchronism with the index pulse; and (5) Five hundred and seventy-six bit pulses corresponding to the master clock pulses not defining digit pulses (i.e., groups of four pulses with one pulse gap between, these gaps being defined by digit pulses).

The logical relationship of the areas of the disk within the register area following index time is shown in FIGURE 4(*b*). It will be noted that on tracks 205 and 206, one bit area on which no information is stored occurs between each group of four bit areas in which each decimal digit may be stored. As discussed above, these "No Information" areas correspond to digit pulses. Digit pulses are used for functions which are carried out during the time between the four bit groups on the information tracks 205 and 206.

Read heads $R_1$–$R_4$ associated with information tracks are located at quarter positions on the fixed member of the memory. Write heads $W_1$ and $W_2$ are located slightly past a quarter position. The effective displacement of write heads $W_1$ and $W_4$ is one digit area plus the small time displacement required for the electronic circuitry to respond to a signal produced by a write head.

As best shown in FIGURE 1, when a four bit digit is read out of memory unit 110, it is normally applied through adder/subtractor 202 and pushed through toggles $X_{13}$, $X_{14}$, $X_{15}$ and $X_{16}$. By the time the entire digit is properly positioned in those toggles, the memory unit will have advanced four bit spaces. By the time the digit is analyzed and corrected where necessary, another bit space will have passed write heads $W_1$ and $W_2$. Therefore, the $X_{13}$, $X_{14}$, $X_{15}$, and $X_{16}$ toggles 800–803 will not be set in time for re-recording through write heads $W_1$ or $W_2$ until after memory unit disk 204 has rotated slightly more than one digit area.

The off-set spacing of write heads $W_1$ and $W_2$ is also used to advantage in the multiplication process in that a digit may be shifted forward relatively to its original position in the word area by directly connecting a write head $W_1$ or $W_2$ to a read head $R_1$–$R_4$ and by-passing the *adder/subtractor* and buffer storage toggles as explained above.

In the system here described, the operations involving the memory disk are tabulated below:

*1. Entry*

A number introduced into the memory originates from the typewriter keyboard while disk 204 is operating at a continous speed of approximately 3450 r.p.m. The digit is entered into buffer word registers $B_1$, $B_2$ and $B_3$ in triplicate through suitable gating and timing controls.

Referring to FIGURE 3(*a*), numerical entry is effected upon depression of numerical typewriter keys through encoder 200 and buffer storage device 201. As the buffer storage device is set up to represent a digit in binary decimal form while memory disk 110 is rotating, head gating circuit 219 will enable write head $W_2$ to enter the four bits representing the digit into the area representing the order selected by the program card 300 according to the carriage position in each of buffer registers $B_1$–$B_3$ (FIGURE 4*a*), when the corresponding area in each register is in operative relation with write head $W_2$. So long as the typewriter carriage remains at a position where a digit entry has been made, write head $W_2$ is gated on each time the approprite digit area in each of buffer registers $B_1$ to $B_3$ passes in operative relation. Thus, each entry is recorded in buffer registers $B_1$ to $B_3$ in triplicate so that the entry can be transferred from any one of these registers to a correspondingly located register with no external storage being required other than toggle 800–803, see FIGURE 1.

It will be understood that each successive digit keyed may be directed into the next lower order of memory buffer register $B_1$, $B_2$, $B_3$, through appropriate head gating control of circuit 219, and that the destination of the highest order digit is determined by external program unit 101 described more fully in the parent case.

*2. Accumulation*

Registers A, B, C, D, E, and F are accumulate registers. It is possible to add the number entered in buffer word registers $B_1$ to $B_3$ to all or any one of these accumulate registers. During the first quarter (see FIGURE 4*c*) read heads $R_1$ and $R_3$ may be used simultaneously to add (or subtract) the number entered in buffer registers $B_1$ and $B_3$ to the numbers stored in accumulate register A, B and C and to enter the new accumulation into transfer registers $T_1$, $T_2$ and $T_3$ .During the second quarter (see FIGURE 4*d*) read head $R_4$ is energized and the number transferred from register area $T_1$ to A; $T_2$ to B; $T_3$ to C. If only one of registers A, B and C were desired to be modified, then the gating is set up so that only one of registers A, B and C is permitted to participate in this process.

During the third quarter (see FIGURE 4*e*) a number entered in buffer registers $B_1$ to $B_3$ may be added (or subtracted) to a number stored in the D, E or F registers by simultaneously gating on read heads $R_1$ and $R_4$. The new number is then temporarily placed in registers $T_4$, $T_5$ or $T_6$ by write head $W_2$.

During the fourth quarter (see FIGURE 4f), the number stored in registers $T_4$, $T_5$ or $T_6$ is read out by read head $R_4$ and entered without further modification in whichever of the registers D, E or F the original stored number was taken from. Thus, as a result of completing one rotation of disk 204, one complete addition (or subtraction) may be accomplished for all or any one of accumulate registers A, B, C, D, E and F.

*3. Multiplication*

(a) *Entry of multiplicand.*—The process of multiplication takes place by first entering one factor, referred to as the multiplicand, into the appropriate place in the memory (multiplicand register $M_3$) via buffer register $B_3$, then entering the second factor, referred to as the multiplier, into buffer register $B_1$–$B_3$, and then causing shifts and additions of the multiplicand to itself a number of times equal to the value of the multiplier, until finally the product has been formed in the product primary registers $P_1$–$P_3$, which registers serve as one continuous register of thirty-six digit capacity. The process that takes place is thus that of accumulation of partial products until the full product has been formed. This process will be described in detail below.

In entering a multiplicand, the fact that the number is to be a factor in a forthcoming multiplication is signified by program unit 101 (FIGURE 3(*a*)) but initial entry is effected into memory buffer register $B_1$, $B_2$ and $B_3$ as described above.

During a subsequent 360° rotation, effective action takes place during the first and fourth quarters only. During the first quarter, read head $R_3$ is connected, via buffer storage 201 (FIGURE 3*a*) having toggles 800–803 (as shown in FIGURE 1), to write head $W_2$ and the contents of buffer register $B_3$ transferred (without modification) to register $T_3$. During the fourth quarter, read head $R_3$ is again connected, via unit 201, to write head $W_2$ and the contents of Register $T_3$ are transferred (without modification) to the multiplicand register $M_3$. As a result of this one revolution of the memory disc, the first factor for multiplication (Ican) is now stored in the multiplicand register ($M_3$).

(b) *Entry of multiplier.*—The second factor for multiplication, the multiplier, is introduced into the three buffer registers $B_1$–$B_3$ as usual in the entry process. The number remains in the buffer register $B_1$–$B_3$ during the multiplication process and the digits are retrieved one by one and applied to buffer storage toggles 800–803 of unit 201 (FIGURES 1 and 3(*a*)), from which the value is transmitted to a multiplier counter as fully described in the parent case.

The process of multiplication or product development is carried out by multiplying the value in multiplicand register $M_3$ by the successive digits of the multiplier starting with the most significant multiplier digit, and is initiated by suitable, external program signal.

Before multiplication can actually take place, it is necessary to shift the contents of the multiplicand register $M_3$ (which, as explained above, contains the first factor or multiplicand entry) in such manner that the product will be properly positioned in the combined product register areas $P_1$–$P_3$ when the multiplication process is completed. This shift is a function of the location of decimal points within the multiplicand and the multipier. For an invoicing operation as described above in connection with FIGURE 2, the location of the decimal may be readily controlled by the typewriter entries and preparation of the typewriter program source.

For purposes of illustration of the system herein described, the multiplicand (Icand) is shifted nine digit positions from its original position in the $M_3$ register in the direction of rotation of disk 204, or in the less significant direction, as shown in FIGURE $4a_2$. This is performed as follows: During the first quarter cycle (see FIGURE 4*c*) read head $R_4$ is connected to write head $W_2$ without going through the digit shift register provided by buffer storage toggles 800–803. As a result, during this first quarter, the contents of the multiplicand registers $M_1$–$M_3$, now functioning as one continuous unit of large capacity, are recorded in temporary storage registers $T_1$, $T_2$ and $T_3$ (similarly as a continuous unit of large capacity), however, advanced by one digit position from the relative position in which they existed in the multiplicand register $M_1$–$M_3$. This advance is caused by the one character displacement of read head $W_2$ from an exact 90° position as clearly shown in FIGURE $4a_2$. No further action takes place until the fourth quarter (see FIGURE 4*f*) at which time read head $R_3$ is connected to write head $W_2$, but this time through the digit shift register provided by buffer storage toggles 800–803. This time the contents of temporary storage registers $T_1$–$T_3$ are recorded back into the multiplicand registers $M_1$–$M_3$. As a result of this one rotation, the information now stored in the multiplicand registers $M_1$–$M_3$ has been advanced, or right shifted, one digit position. This process will be repeated eight more times as indicated in FIGURE $10a_2$, unless interrupted by additional controls, and as a result the multiplicand will now have been shifted downward nine digit positions and the first factor will now exist more nearly in the center of the group of the three sectors representing the multiplicand registers $M_1$–$M_3$, as seen in FIGURE $4a_2$.

Note that it would be possible to make two shifts per revolution each of one digit position, by bypassing the digit shift register during the transfer of each shifting step, i.e. $M_1$–$M_3$ to $T_1$–$T_3$ and $T_1$–$T_3$ to $M_1$–$M_3$, but for reasons related to simplicity of control circuits, it has been found more economical to allow only one shift per revolution. The time for the shift is short relative to that required for manual entry of data on the typewriter. The process of product development is now ready to start.

Product development starts by taking the most significant digit in the multiplier from buffer register $B_1$ and transferring it to a *multiplier counter* 217 (FIGURE 3 (*a*)). This takes place during the first quarter cycle of rotation of disk 204 as shown in FIGURE 4*c*. Read head $R_3$ is connected to the buffer storage toggles 800–803 and the most significant digit of the second factor stored in buffer register $B_1$ is transferred into the *multiplier counter*. If the multiplier digit transferred is non-zero, in the same first quarter cycle the number in the multiplicand registers $M_1$–$M_3$ is gated into the product secondary registers $S_1$–$S_3$. This is accomplished by connecting read head $R_4$ to the *adder/subtractor* 202 (FIGURE 3(*a*)) which is connected to the digit shift register toggles 800–803 in the loop and recording the resultant sum, which in essence is a partial product, with write head $W_1$ in product secondary registers $S_1$–$S_3$.

In the third quarter (see FIGURE 4*e*) the new partial product in the product secondary registers $S_1$–$S_3$ is applied to the *adder/subtractor* 202 along with the multiplicand from registers $M_1$–$M_3$ and the resultant sum developed in the digit shift register toggles 800–803 is transferred to the product primary registers $P_1$–$P_3$. This is accomplished by connecting read heads $R_2$ and $R_3$ to the *adder/subtractor* and recording the results from the digit shift register toggles 800–803 by write head $W_1$. As a result of the above process, the Icand has been added to itself twice in one revolution of the memory unit, completing multiplication by "2."

If the multiplier value entered into the multiplier counter was greater than 2, say 4, for example, the multiplication cycle repeats in the next rotation of memory disc 110. In the first quarter, with twice the multiplicand already stored in product registers $P_1$–$P_3$, this subproduct is added to the multiplicand standing in registers $M_1$–$M_3$, and the sum (equal to three times the multiplicand) is gated to secondary product registers $S_1$–$S_3$. This is accomplished by connecting read heads $R_2$ and $R_4$ to the *adder/subtractor* 202, which in turn, through buffer storage 201, transmits the sum to write head $W_1$ and the registers $S_1$–$S_3$. In the third quarter of the same rotation, the three times the multiplicand now standing in registers $S_1$–$S_3$ is combined with the multiplicand value in registers $M_1$–$M_3$ and transferred to registers $P_1$–$P_3$. This is accomplished by concurrent enabling of heads $R_2$, $R_3$ and $W_1$ with appropriate inclusion of *adder/subtractor* 202 for effecting addition of correspondingly ordered digits.

It should be explained at this point that during the first quarter of the initial multiplication revolution of the memory, read head $R_2$ was gated on to read out the value standing in registers $P_1$–$P_3$, but this was not effective, as no value was present in said registers at that time and only zeros were read out into *adder/subtractor* 202.

The digit in the multiplier counter is reduced by one during each of these transfer processes. As soon as the multiplier counter counts down to zero, the repeated adding process is stopped. If the multiplier counter is set at a "one" when the transfer to product secondary registers $S_1$–$S_3$ occurs, the second transfer back to product primary registers $P_1$–$P_3$ takes place without connecting the multiplicand registers $M_1$–$M_3$ to the *adder/subtractor* 202 and the result is that the partial product developed in the product secondary registers $S_1$–$S_3$ is merely transferred to the product primary registers $P_1$–$P_3$.

Additions take place one by one, but two additions may occur each revolution, each addition in turn reducing the count by one in the multiplier counter until it reaches zero. When the multiplier counter reaches zero and the partial product has been returned to product primary register $P_1$–$P_3$, the process stops.

To multiply by the next most significant digit of the multiplier stored in buffer register $B_1$, the digit stored in each multiplicand registers $M_1$–$M_3$ is shifted one digit position further in the direction of disk rotation to effectively shift the decimal one additional position, but the partial product in primary register $P_1$–$P_3$ remains in its original position.

Then in the next revolution the next most significant digit in the multiplier stored in buffer register $B_1$ is selected, and the process described above is continuously repeated. This process repeats until all of the digits in the multiplier stored in buffer register $B_1$ have been processed, at which time multiplication is complete and the proper product exists in the product primary registers $P_1$–$P_3$.

As will be apparent from the immediately preceding description of the multiplying operation, registers $M_1$–$M_3$, $S_1$–$S_3$ and $P_1$–$P_3$ all serve as combined large capacity units (36 digits each) and coupled with the shift of the multiplicand in $M_1$–$M_3$ described above, they permit formation of a product in excess of twelve digits which could be accommodated by a single standard sized register, and provide for multiplications with a predetermined decimal point. As indicated in FIGURE $4a_2$, the final product will appear in register $P_2$, with decimal orders having a tendency to overflow into $P_1$, except for a round off feature explained below.

The system of the present invention also provides a half cent round off following a multiplication operation. The half cent round off function is automatically accomplished by having a five stored in the No. 12 digit area of product primary register $P_1$ before multiplication starts. This area is darkened in FIGURE $4a_2$ and labelled ½ R.O. The actual product read out is from product primary register $P_2$, the lower order digits in register $P_1$, if any, being discarded. Also, the maximum output capacity of the system programmed as described, is 10 digits, all of which are stored in product primary register $P_2$. If the number in $P_2$ exceeds 99,999,999.99, the complement of the least significant 10 digits of the number is typed out followed by a *Cr* symbol automatically provided by the circuitry involved.

Negative numbers are stored as complements with the sign digit (9) appearing in the most significant or eleventh order position. All registers have a characteristic of being credit balance registers. They are capable of being read out as true value plus sign and are not restricted to operating in the positive direction only. The *adder/subtractor* of FIGURE 1 is used in the complementation process. This is accomplished by subtracting the appropriate register quantity from zero.

In multiplication, the multiplicand and multiplier are always entered as true values and the sign of the product determined by external circuitry. If the product is to be negative, it is developed by subtraction rather than by addition resulting in the formation of the appropriate complement.

In the readout process the characters are read out one by one starting with the most significant, the zeros preceding the first non-zero digit being suppressed as ex plained in the parent application. Before readout takes place, however, it is necessary to ascertain whether the quantity being read out is a complement in which case, it is necessary to recreate the absolute value and print out the result with a suitable sign. This is accomplished with the aid of minus and complement circuit 218 as follows. When readout is required, during the first revolution, the contents of any particular register A, B, C, D, E or F on track 205 desired are automatically complemented regardless of sign and the complement is stored in the associated temporary storage register $T_1$–$T_6$ on the inner track 206. In the next revolution the sign of the register is detected. If the sign is negative (indicated by the presence of a 9 in the sign position) then the results are taken from the appropriate T register which, in such a case, would be storing the true value. If the sign is positive the number is taken from the regular register which contains the true value. This process is automatic and occurs on all readout operations, including readout of the product primary register $P_2'$ the complemented value of which is stored in the product secondary register $S_2$. In the case that the product has been a complement, an appropriate compensation consisting of adding one to the least significant digit is made to produce the correct rounded true value, as fully explained in the parent application.

6. *Timing signals*

To provide synchronization of the operation of the gating and counting circuits with the instantaneous position of disk 204 at all times, clock tracks 207 and 208 are arranged for records of representation which are reproduced to provide clock pulses. Pulses are reproduced from master clock track 207 by read head 211 (FIGURE 3(a)) to provide evenly spaced basic timing pulses which are applied to control the electronic control unit. These pulses are designated as master pulses which define and correspond to the least areas on information tracks 205 and 206 (see FIGURE 4*b*).

Pulses are reproduced from clock tracks 207 and 208, and applied to circuits shown in FIGURES 5(*a*) and (*b*), to produce the following distinct clock pulse trains once per revolution:

(1) One index pulse at the beginning of the first quarter revolution;

(2) One pre-index pulse which precedes the index pulse by one master clock period, i.e., at the end of the fourth quarter;

(3) Four quarter pulses, one corresponding to the beginning of each quarter;

(4) One hundred and forty-four digit pulses, spaced evenly, corresponding to each fifth master clock pulse, commencing in synchronism with the index pulse; and (5) Five hundred and seventy-six bit pulses corresponding to the master clock pulses not defining digit pulses (i.e., groups of four pulses with one pulse gap between, these gaps being defined by digit pulses).

The logical relationship of the areas of the disk within the register area following index time is shown in FIGURE 4*b*. It will be noted that on tracks 205 and 206, one bit area on which no information is stored ocurs beneath each group of four bit areas in which each decimal digit may be stored. As discusesd above, these "No Information" areas correspond to digit pulses. Digit pulses are used for functions which are carried out during the time between the four bit groups on the information tracks 205 and 206. One function, for example, is the use of a digit pulse for correcting a digit in buffer storage toggles 800–803 (FIGURE 1) when required as discussed in the parent application.

Read head $R_1$–$R_4$ associated with information tracks are located at quarter positions on the fixed member of the memory. Write heads $W_1$ and $W_2$ are located slightly past a quarter position. The effective displacement of write heads $W_1$ and $W_4$ is one digit area plus the small time displacement required for the electronic circuitry to respond to a signal produced by a write head.

As best shown in FIGURE 1, when a four bit digit is read out of memory unit 110, it is normally applied through *adder/subtractor* 202 and pushed through toggles $X_{13}$, $X_{14}$, $X_{15}$ and $X_{16}$. By the time the entire digit is properly positioned in those toggles, the memory unit will have advanced four bit spaces. By the time the digit is analyzed and corrected where necessary, another bit space will have passed write heads $W_1$ and $W_2$. Therefore, the $X_{13}$, $X_{14}$, $X_{15}$ and $X_{16}$ toggles 800–803 will not be set in time for re-recording through write head $W_1$ or $W_2$ until after memory unit disk 204 has rotated slightly more than one digit area.

The off-set spacing of write heads $W_1$ and $W_2$ is also used to advantage in the multiplication process in that a digit may be shifted forward relatively to its original position in the word area by directly connecting a write head $W_1$ or $W_2$ to a read head $R_1$–$R_4$ and by-passing the *adder/subtractor* and *buffer storage* toggles as explained above.

*Clock pulse distributor.*—Reading heads 211 and 212 (FIGURES 3(*a*) and 5) are positioned adjacent clock tracks 207 and 208 for generation of electrical signals for transmission to a clock pulse distributor 213. The clock pulse distributor of FIGURE 5 is arranged for producing the following clock pulse trains once per revolution:

(1) One *index* clock pulse on lead 1122 (FIGURE 5*b*) at the beginning of the first quarter revolution which corresponds with the position of the memory unit as shown in FIGURE 4*c*;

(2) One *pre-index* clock pulse on lead 1143 which precedes in time the index pulse by one master clock period;

(3) Four *quarter* clock pulses on lead 1124, one corresponding to the beginning of each quarter revolution position of the memory unit as shown in FIGURES 4*c*, *d*, *e* and *f*;

(4) One hundred forty-four *digit* clock pulses on lead 1120, spaced evenly corresponding to each fifth master clock pulse, commencing in synchronism with the index pulse; and (5) Five hundred seventy-six *bit* clock pulses on lead 1135 corresponding to master clock pulses excepting for those that occur when a *digit* clock pulse is present on lead 1120.

Also provided by the clock pulse distributor of FIGURE 5 are voltage levels, as distinguished from pulses. On lead 1117 a signal is present at index time for the duration of one master clock interval, and at all other times such signal is present on $\overline{\text{index level}}$ lead 1116. Other levels are generated by the circuitry of FIGURE 11 for leads 1148, 1150 and 1151 as explained in detail below.

Such levels and pulses may be used for identifying the precise position of memory disk 110 for use during operations of recording and reproducing information on and from assigned positions in the memory unit and for synchronously controlling system operation.

The clock pulse distributor of FIGURE 5 comprises three counting toggles 1100, 1101, 1102 connected as a five-place counter through input gating of FIGURE 5(*a*) to count master bit pulses and to go through a cycle of operation in response to each sequence of five of such master bit pulses. It will be recalled from FIGURE 4*b* that each digit area is composed of four bit areas plus a bit space between adjacent digit areas. Thus, the leading edges of successive digit areas are five bit areas, corresponding in time to five master bit pulses, apart.

A *digit* clock pulse is produced on lead 1120 once every time the "4" counter toggle 1102 is in a unit condition, and bit clock pulses are produced on lead 1135 at counts of "0" through "3" of clock distributor counter toggles 1100, 1101, 1102.

Master bit clock read head 211 drives read head toggle 1108 through amplifier 1109. The output signals from read head toggle 1108 are differentiated and applied to *or* gate 1110 having output lead 1107 which is coupled to *and* gate and amplifier circuits 1103 on FIGURE 5(*b*). The signal on lead 1107, which is referred to as the raw clock pulse, is a negative going pulse whereas the output clock pulses from *and* gate amplifiers 1103 (see FIGURE 5(*b*)) are positive going pulses having a duration of about two microseconds.

The negative going raw clock pulses on lead 1107 are also applied through inverter 1111 to lead 1112 of FIGURE 5(*a*) to serve as positive going enabling pulses for each of the several *and* gates which control operation of clock distributor counter toggles 1100, 1101, 1102, *quarter revolution and pre-index* toggle 1105 and *index* toggle 1106.

Clock distributor counter toggles 1100, 1101, 1102, operate through successive counts of 0, 1, 2, 3, and 4 in that order and are then reset to zero to thereby provide a five-place counter, one count corresponding to the displacement of the disc memory unit by one master bit area. One complete cycle of the digit counter thus corresponds to an advancement of the disc memory unit by one digit area. This counter is kept synchronized with the beginning of the digit areas on the memory unit by the operation of the *quarter revolution and pre-index* toggle 1105 and *index* toggle 1106 through various circuit connections to the input gates of the counter toggles 1100, 1101, 1102.

The *quarter revolution clock reading* head 212 is coupled directly through *or* gate 1113 without further gating to the unit input of *quarter revolution and pre-index* toggle 1105 to thereby set this toggle to its unit condition each time the pre-index position and positions defining the beginning of the second, third and fourth quarter revolution positions of the memory disk pass reading head 212. The quarter revolution positions correspond to a count of four in the clock distributor counter and the pre-index position corresponds to a count of three in the same counter. The count of four is represented by the "4" counter toggle 1102 being in its unit condition and the "1" and "2" digit counter toggles 1100 and 1101 being in their zero condition. The count of three is represented by the "1" and "2" counter toggles 1100 and 1101 being in their unit condition and the "4" counter toggle 1102 being in its zero condition.

*Quarter revolution and pre-index toggle* 1105 is reset to its zero condition after registering a quarter revolution position through *and* gate 1160 by the input potential on lead 1136 from the units output of "4" digit counter toggle 1102, and is reset to its zero condition after registering a pre-index position through *and* gate 1162 by the input potential on lead 1117 from the units output of *index* toggle 1106. Both of *and* gates 1160 and 1162 are supplied with raw clock pulses from lead 1112 which occur at the time intervals spaced by approximately twenty-four microseconds in the embodiment illustrated.

As pointed out above, pre-index time occurs one master bit time prior to index time. At the pre-index position in clock track 208, the magnetization pattern changes polarity at one master bit position prior to index position and accordingly causes the *quarter revolution and pre-index* toggle 1105 to transfer to its units condition when the clock distributor counter indicates a count of three. This identifies the pre-index position rather than a quarter revolution location, and occurs when *quarter revolution and pre-index* toggle 1105 is triggered to its condition when the digit counter indicates a count of four.

*Index* toggle 1106 is set to its unit condition by an output signal from *and* gate 1128. This requires an output signal on zero lead 1114 from the "4" toggle 1102, meaning that the digit counter is not indicating a count of "4." The other inputs to gate 1128 require that the toggles be in such condition that a unit output is present on lead 1115 indicating a unit condition of *quarter revolution and pre-index* toggle 1105 and an output on lead 1116 indicating a zero condition of *index* toggle 1106. With the next raw bit clock pulse on lead 1112, *index* toggle 1106 is transferred to its unit condition. This unit condition in normal operation occurs only when a four count is indicated in the digit counter.

*Index* toggle 1106 is reset through *and* gate 1164 by a signal on lead 1117 which is from the unit output on *index* toggle 1106 when the next raw clock pulse appears on lead 1112. Thus *index* toggle 1106 stays in its units condition for a period corresponding to the period between two successive master bit clock pulses.

Synchronization of the clock distributor counter toggles with the index position of the memory disk is provided by applying the zero condition of *index* toggle 1106 on lead 1116 as an input to each of *and* gates 1129, 1130 and 1131 to the unit input of each of the counter toggles 1100, 1101, 1102 respectively. Unless *index* toggle 1106 is in its zero condition, none of the digit counter toggles 1100–1102 can advance to a unit condition.

In addition, clock distributor counter toggles 1100 and 1101 are reset to a zero condition by the signal on units output lead 1117 of *index* toggle 1106 upon the receipt of the next raw clock pulse on lead 1112 by *and* gates 1132 and 1133, respectively. This means that anytime *index* toggle 1106 indicates a unit condition, counter toggles 1100 and 1101 will be reset to zero at the time the next raw clock pulse is received on lead 1112. Thus, synchronization is automatically effected within the time required for a few revolutions of the memory unit after the system is first turned on and is continuously effected during operation.

The counter toggles 1100, 1101, and 1102 are connected as a conventional five-place counter. Toggle 1100 is set to its units condition by the output from *and* gate 1129 which contains as input signals a zero condition from *index* toggle 1106 on lead 1116, a zero condition from toggle 1100 itself on lead 1166, and the signal on lead 1114 indicating a zero condition of counter toggle 1102. At the time of the next raw clock pulse on lead 1112, toggle 1100 is reset to its zero condition by the output signal from *and* gate 1168 while the next counter toggle 1101 is set to its units condition by the output signal from

*and* gate 1130. At the time of occurrence of the next raw clock pulse on lead 1112, counter toggle 1100 is again set to its units condition through *and* gate 1129 while counter toggle 1101 retains its units condition thereby indicating a count of three. When the next raw bit clock pulse appears on lead 1112, counter toggle 1102 is set to its units condition by the output from *and* gate 1131 while counter toggles 1100 and 1101 are reset to their zero condition by *and* gates 1168 and 1170 respectively.

Timing signals provided at the output of the clock distributor in FIGURE 5*b* include an *index* level on lead 1117. When *index* toggle 1106 is in its unit condition, the voltage on index level lead 1117 is approximately ground and when the toggle is in zero condition, the voltage on lead 1117 is approximately minus eighteen volts. The same voltage level, but in reversed time sequence, is present on (index level) lead 1116.

The *quarter clock* level on lead 1148 is provided through *and* gate 1149 when there is coincidence between a four in the clock distributor counter (i.e. toggle 1102 is in its unit condition supplying an output signal on lead 1136) and *quarter revolution and pre-index* toggle 1105 is in its unit condition. The *pre-index* level on lead 1150 is present where there is a three in the clock distributor counter and *quarter revolution and pre-index* toggle 1105 is in its unit condition.

The *minus-round-off level* on lead 1151 is provided when there is a zero in all three clock distributor counter toggles 1100, 1101, 1102 of the digit counter. The *minus round-off* level on lead 1151 is used in the head gating circuit of FIGURE 19*b* in the parent application.

All of the clock pulses produced on the output leads of FIGURE 5(*b*) are provided from a combination *and* gate and amplifier 1103 which has as one input the raw master clock pulse on lead 1107. The other input to each of the combination *and* gate and amplifiers 1103 is through an invertor 1104 which inverts the high or ground voltage normally used as the control signal voltage to a low voltage and the low voltage to a high or ground voltage by a circuit as shown in FIGURE 6.

Referring now to FIGURE 6, a circuit containing three transistors 1200, 1202 and 1204 is illustrated which is a physical embodiment of one form of circuit which functions as a combination invertor 1104 and *and* gate amplifier 1103. Input terminals *a* and *b* are shown in the bit clock circuit of FIGURE 5*b* with the same designations, and when clock distributor counter toggle 1102 is its unit condition whereby a high level voltage is present on lead 1136, transistor 1200 is conducting. When a raw negative going master clock pulse on lead 1107 is applied to the collector of transistor 1200, the pulse finds a low impedance through the conducting transistor and hence is absorbed and does not cause conduction of transistor 1202.

When the input signal level on lead 1136 is low, indicating that the clock pulse distributor toggle 1102 is in zero state, transistor 1200 is not conducting. A raw negative going master clock pulse on lead 1107 then causes transistor 1202 to conduct during the duration of the pulse. Transistor 1202 is connected as an emitter follower and a negative output pulse is applied through the capacitor and resistance network 1206 to key on normally non-conducting transistor 1204. When transistor 1204 conducts, a positive going pulse having an amplitude of approximately 3 volts and a duration of about two microseconds is produced at the output lead 1135 of transformer 1208. This is the timing pulse which is available at terminal *c* (see also FIGURE 5(*b*)) and which is applied to the various other circuits throughout the system.

From the foregoing, it is apparent that the *bit* clock pulses provided on lead 1135 of FIGURE 5 (*b*) are present when the signal level on lead 1136 is low during a count of zero through three of the clock distributor counter circuit. When the clock distributor counter indicates a count of four, the signal level on lead 1136 is high thereby blocking the *bit* clock pulse from lead 1135.

An identical circuit is used for providing a *digit* clock pulse on lead 1120. The input to invertor 1104 is on lead 1114 which is from the zero output of counter toggle 1102. Only when toggle 1102 is in its units condition is the output signal on lead 1114 low and thus the digit clock pulse on lead 1120 is provided only at this one count during the operation of the clock distributor counter.

It will be observed, therefore, that when the *digit* clock pulse is provided on lead 1120, the *bit* clock pulse on lead 1135 is omitted.

The *quarter* clock pulse on lead 1124 is provided by a circuit identical to that shown in FIGURE 6, the input to invertor 1104 being supplied from *or* gate 1140. It will be recalled that a quarter clock pulse appears when the clock distributor counter indicates a count of four and when the *quarter revolution* toggle 1105 is in its units condition. Since the output of *or* gate 1140 is inverted, the input signals to *or* gate 1140 are taken from zero output lead 1114 from the "4" counter toggle 1102 and from zero output lead 1141 from *quarter revolution* toggle 1105. The output of *or* gate 1140 is thus high anytime either counter toggle 1102 or quarter revolution toggle 1105 is in its zero condition and thus no output signal appears on *quarter* clock lead 1124. Only when counter toggle 1102 is in its units condition and when *quarter revolution* toggle 1105 is in its units condition is there a low level signal applied to both inputs of *or* gate 1140. Thus, only at that time is the output from *or* gate 1140 at a low level to thereby permit the raw clock pulse on lead 1107 to pass through the combination *and* gate and amplifier 1103 to produce the *quarter* clock pulse on lead 1124.

The *pre-index* clock pulse on lead 1143 is provided by a circuit similar to that just discussed, the *or* gate 1144 having inputs from zero output leads from counter toggles 1100 and 1101 and from the *pre-index* toggle 1105. When anyone of these three toggles is in its zero condition, a high level output is provided from *or* gate 1144 which thereby blocks the raw clock pulse on lead 1107 from appearing at the *pre-index* clock output lead 1143. Only when all three toggles simultaneously register a unit condition is the output from *or* gate 1144 at a low level to thereby permit the raw clock pulse on lead 1107 to be available on *pre-index* clock lead 1143.

An *index* clock pulse is provided on lead 1122 through a circuit similar to that described above. Lead 1116 connected to the input of invertor 1104 is connected to the zero output lead of *index* toggle 1106 and is thus normally a high level potential excepting when the *index* toggle is in its units condition at which time the raw clock pulse on lead 1107 is permitted to pass through the combination *and* gate and amplifier 1103 to provide the *index* clock pulse on lead 1122.

*Extension circuit.*—An extension circuit (FIG. 7) comprises input gating, an *F register extension* toggle $X_{24}$, and a *multiplicand extension* toggle $X_{25}$ arranged in the system for controlling operations which involve recording values in the register areas $M_3$ and F. Write toggle 252 is normally reset at pre-index time. From an inspection of FIGURE 4$a_2$, it is apparent that write heads $W_1$ and $W_2$ will thus be gated off during the time that the sign digit is being recorded in the 11th digit area because of the displacement of write heads $W_1$ and $W_2$ from a quarter revolution position. The four bits of the eleventh order digit of the register area $T_3$ are reproduced in the head $R_3$ and transferred to *buffer storage* toggles 800–803. As the twelfth order (in which no value is recorded) is reproduced from the register area $T_3$, the eleventh order digit is transferred from buffer storage to the recording head $W_2$, which is displaced one digit area in the direction of rotation, for recording in the eleventh order of the register area $M_3$. Since the pre-index position of the disc occurs during the reproduction of the fourth bit of the twelfth digit area of the register area $T_3$ and the recording of the fourth or possibly third bit in the 11th digit area of the register area $M_3$, the recording circuit (FIG.

13) and head gating circuit (FIG. 19) in the parent application are controlled in response to output potentials from *multiplicand extension* toggle $X_{25}$ to maintain the recording operation throughout the 11th digit area and to end the recording at index time in response to the index pulse.

The *mulitplicand extension* toggle $X_{25}$ is set during the *enter Icand cycle* each third quarter revolution by *and* gate 3400. It is also set during the *Icand shift mode* at the same rotational position by *and* gate 3402.

The *F register extension* toggle $X_{24}$ is set by *and* gate 3404 only during an accumulate cycle where the accumulation is to be entered into the F register.

Both *extension* toggles are reset by an *index clock* pulse on lead 3406.

A recording or writing circuit 209 (FIGURES 1 and 3(*a*)) is arranged for supplying recording currents to recording transducers or write heads $W_1$ and $W_2$ for magnetizing the tracks 205 and 206, respectively, in a non-return-to-zero fashion in which magnetization in a first direction of polarity represents a binary naught and magnetization in a second direction represents a binary unit. With this type of recording, magnetization of a track is continuous in the same direction of polarity over successive bit areas of a digit area on which bits of the same value are recorded.

Recording circuit 209 includes input gating, a record or write toggle 252 (shown in FIGURE 1) which in a first state of operation corresponds to a naught and in a second state corresponds to a unit, and output gating. Toggle 252 controls both write heads $W_1$ and $W_2$, and whether either of write heads $W_1$ or $W_2$ is energized depends upon the presence of appropriate input signals.

In addition to the gating signals produced by the logic of the system, the energization of write heads $W_1$ and $W_2$ also requires a write head voltage from the power supply which is of sufficient magnitude to assure that the signals stored in the magnetic disc will be of a usable magnitude. Any deviation of the power supply voltage below a predetermined value will result in complete cut-off of the energizing voltage applied to the center-tap of the windings of write heads $W_1$ and $W_2$, as more fully disclosed in a divisional application serial No. 546,956 filed May 7, 1966.

Reproducing or reading heads $R_1$, $R_2$, $R_3$, $R_4$ (FIGURES 3(*a*) and 4) are located adjacent respective information tracks 205 and 206 for reproducing or reading out information stored thereon to corresponding signals. Signals of a first polarity result from a first direction of polarization, while signals of opposed polarity result from a second direction of polarization, which first direction of polarization may correspond to a binary naught and which second direction of polarization may correspond to a binary unit. The output signals of reproducing heads $R_1$–$R_4$ are connected to a reproducing circuit 210 (FIGURE 3(*a*) which comprises amplifiers and phase inverters for producing direct or inverted signals.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. An electronic calculator comprising a cyclically operating, rotating magnetic memory, a unidigital adder-subtractor, a multiplier digit counter and sequencing means for performing algebraic summation and multiplying operations, said memory device comprising a rotating means having only two information tracks of discrete, variably magnetizable characteristic and clock track means of fixed discrete magnetic characteristic, reading head means cooperating with said clock track means, two read heads and a single write head cooperating with each of said digital data tracks and comprising a transducer set therefor, the two read heads ($R_3$, $R_4$) of one set being disposed in diametric opposition, and the write head ($W_2$) of said set being disposed in a position substantially on a perpendicular to a line through said reading heads, while one read head ($R_2$) and the write head ($W_1$) of the other set are positioned in diametric opposition and the second read head thereof is positioned in substantially perpendicular relation to a line connecting the read and write heads, the two sets of transducers and the clock reading means being phased with respect to each other to enable plural calculating functions during a single cycle of the memory.

2. A calculator according to claim 1 wherein each of said digital tracks is subdivided into plural word segments serving as individual registers, all registers being further subdivided zones and wherein all original entries into said memory are effected exclusively through one set of registers.

3. A calculator according to claim 2 wherein each digital zone is subdivided into equal number of bit locations, and wherein at least one bit location is utilized to compensate for internal delay in arithmetic operations.

4. A calculator according to claim 2 wherein said certain registers which receive original entries are grouped and programmed so as to concommitantly receive an entry in triplicate to enable plural arithmetic operations within a single memory cycle.

5. In an electronic calculator, a memory unit of the revolving type having only two circular information tracks, each divided into quarter track areas with a quarter track area in a first track serving as the input buffer area to the memory unit and with two quarter areas of the other track containing areas serving as accumulator storage areas with one of said last mentioned areas being in phase with said input buffer area; a single recording means for each of said tracks which is the sole means for writing information into the respective track, said recording means being positioned in corresponding quarter revolution positions relative to the tracks; and means for transferring signals stored in said input buffer area into either of said accumulator storage areas in one revolution of said memory unit comprising a first reading means for each track located at a quarter revolution position preceding the position of its recording means in the direction of rotation of said memery unit; a second reading means for said first track located at a quarter revolution position behind the position of the recording means; and a second reading means for said second track located diametrically opposite its recording means.

6. The calculator as defined in claim 5 together with first circuit means including said first reading means for said first track, for transferring signals stored in said input buffer area and recording said signals in a first transfer quarter area in said first track adjacent the input buffer area during a first quarter revolution of the memory unit and then for transferring said signals from said first transfer area by the second reading means for said first track and recording said signals in said one accumulator storage area during the next successive quarter revolution; and second circuit means, including said second reading means for said first track, for transferring signals stored in said input buffer area and recording said signals in a second transfer quarter area in said first track adjacent said input buffer area during a third quarter revolution of the memory unit and then for transferring said signals from said second transfer area by the second reading means for said first track and recording said signals in the other accumulator storage areas during the fourth quarter revolution of the memory unit.

7. The calculator as defined in claim 6 wherein each quarter track area is composed of an integral number of word areas, information entered in said input buffer area is duplicated in each word area of said input buffer area, and said first and said second circuit means include timing signals for gating said reading and recording means to transfer the information from one word area only of said input buffer area to a single correspondingly positioned word area in said accumulator storage areas.

8. In an electronic calculator, a memory unit having a member mounted for rotation having only two circular tracks for storage of information; each of said tracks being divided into four quarter areas with each quarter area being divided into three word areas; and means for recording information into and reproducing information from said tracks comprising a pair of fixedly mounted reproducing transducers for each track located at different quarter revolution positions around said track, and a fixedly mounted recording transducer for each track located at substantially a quarter revolution position which is different from the quarter revolution position of the reproducing transducers, said pair of reproducing transducers for one track being located at diametrically opposite quarter revolution positions and said pair of reproducing transducers for the other track being located at adjacent quarter revolution positions.

9. The computer as defined in claim 8 wherein the recording transducers for both tracks are located and the two tracks so phased that the recording transducers are within the same quarter revolution position.

10. The computer as defined in claim 8 wherein said word areas comprise equal numbers of digit areas, and said recording transducers are displaced from a quarter revolution position by a distance corresponding to approximately one digit area, and further comprising a first circuit for selectively connecting a reproducing transducer to a recording transducer through a one digit delay circuit for transferring information from the digit areas of one word area to the correspondingly located digit areas of another word area, and a second circuit excluding said one digit delay circuit for selectively connecting a reproducing transducer to a recording transducer for transferring information from the digit areas of one word area to digit areas of another word area shifted by one digit area position in the direction of rotation of said member.

11. The computer as defined in claim 10 further containing means for recording a first plural digit number in digit areas of a first word area in a first quarter area through a first recording transducer, and means including said second circuit and a counter circuit for transferring said first plural digit number from said first word area to a position in a second quarter area in the same memory track but shifted a number of digit area positions corresponding to a count supplied to said counter circuit to thereby place the plural digit number in a central position of one of said quarter areas for subsequent arithmetic operations.

12. The computer as defined in claim 11 further containing means for setting the counter circuit to different counts to produce modified decimal alignment in said first plural digit number, said modified decimal alignment being dictated by operator manipulated control means.

13. The computer as defined in claim 11 further comprising means for accumulating said plural digit number from said central position in said second quarter area with a multi-digit number in a first quarter area in the other memory track through a circuit including said one digit delay circuit and for recording the accumulation in a second quarter area in said other memory track.

14. The computer as defined in claim 13 further containing circuit means for accumulation of said plural digit number from said central position in said one quarter area with the accumulations in said second quarter area in said other memory track including said one digit delay circuit and for recording the new accumulation in said first quarter area in the other memory track.

15. The computer as defined in claim 14 further including a multiplier counter circuit and a circuit means controlled by said multiplier counter circuit to produce a number of accumulations of said plural digit number with said multi-digit number and said accumulations corresponding to a numerical value setting of the multiplier counter circuit.

16. An electronic calculator comprising a cyclic magnetic memory means having two information tracks each subdivided into a plurality of registers, each track having a single writing head and two reading heads cooperating therewith, said registers being subdivided into digital orders, a digital adder, a multiplier counter, a gating means, circuit means interconnecting said adder, said heads and said gating means and effective in one setting thereof during a single cycle of said memory to control a first reading head ($R_2$) of one track (205) and a reading head ($R_4$) of another track (206) to transmit digital values from first (P) and second (M) registers to said adder to perform summation and to control the writing head $W_1$ to enter the sum into a third register (S) on said one track (205) and then to control said first reading head ($R_2$) of said one track to read the sum from said third register and to simultaneously enable a second reading head ($R_3$) of said one track to read the value from said second register (M) into the adder, and to furthere enable the same writing head ($W_1$) to enter the new sum into the first register (P).

17. In a rotatable memory unit for an electronic computer, a first circular clock track having signal producing areas corresponding to bit areas and a second circular clock track composed of an index position, an integral number of equi-spaced reference positions at least two orders of magnitude less than the number of bit areas, and a signal producing area at each of said reference positions and at a position one bit area from said index position.

18. The memory unit as defined in claim 17 wherein the second track contains three reference positions which together with the index position divide the second track into four equal parts.

19. The memory unit as defined in claim 17 together with a plural stage binary counter actuated by electrical signals generated by the signal producing areas of both clock tracks.

20. The memory unit as defined in claim 19 wherein the counter contains logic gating circuits to be self-correcting.

21. The memory unit as defined in claim 19 wherein the counter contains output terminals on which predetermined timing pulses are provided and feedback connections from the output of each of said counting stages to input gating stages for controlling the sequence of the conduction conditions of the counting stages, there being unique signal paths in said feedback connections for synchronizing said counter for operation phase with the angular position of said memory unit.

22. In an electronic computer, a memory unit of the revolving type containing an information track divided into register areas into which information may be selectively recorded, a boundary between two register areas corresponding to an index position of the memory unit; a recording head associated with said track for writing information into said register areas; a delay register; a reproducing head associated with said memory unit; clock means for generating timing pulses at times corresponding to index position and to a pre-index position of the memory unit corresponding in time prior to the index pulse by amount substantially equal to the time delay provided by said delay register; a first gating circuit including a toggle stage which when set, gates said recording head on and which is reset by a clock pulse at pre-index position to thereby prevent recording between occurrence of the pre-index and index clock pulses; and an extension circuit including a further toggle stage which is set when the computer is so addressed as to require recording in the register area which passes in operative relation to the recording head during the time between occurrence of the pre-index and index clock pulses and which is reset by the clock pulse at index position; and circuits for connecting said extension circuit to cause said recording head to continue recording in said last mentioned register when the computer is so addressed until the clock pulse at index time is received to thereby prevent non-recordation of information received from the delay circuit between pre-index and index times.

23. Apparatus for multiplying a multiplicand with a multi-digit multiplier which are both recorded in corresponding recording areas of a periodically revolving record medium by multiple addition of the multiplicand carried out for every multiplier digit and corresponding always to the value of the multiplier digit in question and by making a partial product in a product recording range comprising a scanning element ($R_4$) coordinated to the multiplicand recording area, an addition and subtraction unit (202), means connecting the output signal from the scanning element to the input of the addition and subtraction unit, a recording element coordinated to the product recording range, means connecting the output signal from the addition and subtraction unit to the input of the recording element, and a gate circuit controlled by the value of the respective multiplier digit for keying the scanning element and the recording element characterized in that the addition unit (202) and the scanning element ($R_4$) are selectively adjustable also for keying the product recording range (P) and for subtraction.

References Cited

UNITED STATES PATENTS

| | | | |
|---|---|---|---|
| 2,674,732 | 4/1954 | Robbins | 340—347 |
| 2,764,634 | 9/1956 | Brooks | 179—18 |
| 2,770,797 | 11/1956 | Hamilton | 340—174 |
| 2,874,371 | 2/1959 | Foster | 340—172.5 |
| 2,887,269 | 5/1959 | Reisch | 235—160 |
| 2,907,009 | 9/1959 | Lesser | 340—174 |
| 2,946,504 | 7/1960 | Beattie | 235—61.9 |
| 2,974,867 | 3/1961 | Steele | 235—167 |
| 3,063,042 | 11/1962 | Bird | 340—174.1 |
| 3,116,410 | 12/1963 | La Manna | 340—172.5 |
| 3,167,646 | 1/1965 | Giroux | 235—165 |

ROBERT C. BAILEY, *Primary Examiner.*

P. L. BERGER, I. S. KAVRUKOV, *Assistant Examiners.*